(12) United States Patent
Basol et al.

(10) Patent No.: US 7,238,092 B2
(45) Date of Patent: *Jul. 3, 2007

(54) LOW-FORCE ELECTROCHEMICAL MECHANICAL PROCESSING METHOD AND APPARATUS

(75) Inventors: Bulent M. Basol, Manhattan Beach, CA (US); Cyprian E. Uzoh, Milpitas, CA (US); Jeffrey A. Bogart, Los Gatos, CA (US)

(73) Assignee: Novellus Systems, Inc., Phoenix, AZ (US)

( * ) Notice: Subject to any disclaimer, the term of this patent is extended or adjusted under 35 U.S.C. 154(b) by 568 days.

This patent is subject to a terminal disclaimer.

(21) Appl. No.: 10/155,828

(22) Filed: May 23, 2002

(65) Prior Publication Data

US 2003/0064669 A1    Apr. 3, 2003

Related U.S. Application Data

(60) Provisional application No. 60/326,087, filed on Sep. 28, 2001.

(51) Int. Cl.
*B24B 7/04* (2006.01)
*B23H 7/26* (2006.01)
*C25F 3/30* (2006.01)

(52) U.S. Cl. ............. 451/259; 204/224 M; 204/224 R; 205/640; 205/662; 205/663; 205/670; 451/317; 451/413; 451/283; 451/285; 451/287

(58) Field of Classification Search .......... 204/224 M, 204/224 R, 212, 275, 237; 451/296, 41, 451/168, 259, 283, 285, 287, 317, 413; 428/133; 205/662–663, 640, 670

See application file for complete search history.

(56) References Cited

U.S. PATENT DOCUMENTS

| | | | | |
|---|---|---|---|---|
| 3,779,887 A | * | 12/1973 | Gildone | 204/224 R |
| 4,339,319 A | * | 7/1982 | Aigo | 204/224 R |
| 4,609,450 A | * | 9/1986 | Seimiya et al. | 204/217 |
| 4,631,220 A | * | 12/1986 | Clifton | 428/133 |
| 5,762,544 A | | 6/1998 | Blumenkranz et al. | |
| 5,807,165 A | * | 9/1998 | Uzoh et al. | 451/41 |
| 5,810,964 A | | 9/1998 | Shiraishi | |
| 5,993,293 A | * | 11/1999 | Cesna et al. | 451/41 |
| 6,179,690 B1 | * | 1/2001 | Talieh | 451/41 |
| 6,217,418 B1 | * | 4/2001 | Lukanc et al. | 451/41 |
| 6,241,585 B1 | | 6/2001 | White | |

(Continued)

FOREIGN PATENT DOCUMENTS

| | | |
|---|---|---|
| WO | WO 99/22908 | 5/1999 |
| WO | WO 00/26443 | 5/2000 |
| WO | WO 00/77278 | 12/2000 |
| WO | WO 01/13416 | 2/2001 |

*Primary Examiner*—Roy King
*Assistant Examiner*—Lois Zheng
(74) *Attorney, Agent, or Firm*—Knobbe, Martens, Olson & Bear, LLP

(57) ABSTRACT

The present invention relates to semiconductor integrated circuit technology and discloses an electrochemical mechanical processing system for uniformly distributing an applied force to a workpiece surface. The system includes a workpiece carrier for positioning or holding the workpiece surface and a workpiece-surface-influencing-device (WSID). The WSID is used to uniformly distribute the applied force to the workpiece surface and includes various layers that are used to process and apply a uniform and global force to the workpiece surface.

31 Claims, 13 Drawing Sheets

U.S. PATENT DOCUMENTS

| | | | |
|---|---|---|---|
| 6,406,363 B1 * | 6/2002 | Xu et al. | 451/296 |
| 6,609,961 B2 * | 8/2003 | Lacy et al. | 451/296 |
| 2002/0121445 A1 | 9/2002 | Bogart et al. | |
| 2003/0106807 A1 * | 6/2003 | Basol et al. | 205/670 |

* cited by examiner

LOW-FORCE ELECTROCHEMICAL MECHANICAL PROCESSING METHOD AND APPARATUS

CROSS-REFERENCE TO RELATED APPLICATIONS

This application claims the benefit of priority to U.S. Provisional Application Ser. No. 60/326,087 filed Sep. 28, 2001.

FIELD OF THE INVENTION

The present invention relates generally to semiconductor integrated circuit technology and, more particularly, to electrotreating or electrochemical apparatus and processing techniques such as electroplating and electroetching that are applied to a workpiece surface.

BACKGROUND OF THE INVENTION

Conventional semiconductor devices such as integrated circuits (IC) generally include a semiconductor substrate, usually a silicon substrate, and several sequentially formed conductive material layers separated by insulating material layers. Conductive material layers, or interconnects, form the wiring structure of the IC. A wiring structure is isolated from the neighboring wiring structures by insulating layers or interlayer dielectrics. A dielectric material that is commonly used in silicon ICs is silicon dioxide, although there is a current trend to replace at least some of the standard dense silicon dioxide material in the IC structure with low-k dielectric materials. This replacement is necessary in high performance ICs where the RC time constant needs to be reduced to increase the speed of the circuit. To reduce the capacitance, the high dielectric constant materials in the interconnect structure needs to be replaced with low-k materials.

There are various low-k materials that have been used in the industry. These are organic, inorganic, spin-on and CVD materials. Some low-k materials are porous with dielectric constants well below 3.0. As is well known, implementing low-k dielectrics presents many manufacturing challenges. For example, their low mechanical strength and/or poor adhesion to the substrate present some challenges in the semiconductor industry.

IC interconnects are formed by filling a conductor such as copper in features or cavities etched into the dielectric interlayers by a metallization process. Copper is becoming the preferred conductor for interconnect applications because of its low electrical resistance and desired electromigration property. Currently, electroplating is the preferred process for copper metallization.

In the typical IC, multiple levels of interconnect structures extend laterally with respect to the substrate surface. Interconnects formed in sequential layers can be electrically connected using features such as vias or contacts. In a typical interconnect fabrication process, an insulating layer is first formed on the semiconductor substrate. Patterning and etching processes are then performed to form features or cavities such as trenches, vias, and pads etc., in the insulating layer. Then, copper is electroplated to fill the features. In such electroplating process, the workpiece or wafer (these terms are used interchangeably herein) is placed on a wafer carrier and a cathodic (−) voltage with respect to an electrode is applied to the wafer surface while the electrolyte or the electrolyte solution wets both the wafer surface and the electrode.

Once the plating process is over, a material removal step such as a chemical mechanical polishing (CMP) process is performed to remove the excess copper layer (also called copper overburden) from the top surfaces (also called field region) of the wafer, thereby leaving copper only within the features. An additional material removal step is then performed to remove other conductive layers such as the barrier/glue layers that are on the field regions. In this manner, deposited copper within the features are physically as well as electrically isolated from each other. It should be noted that material removal processes include, but are not limited to, CMP, electroetching and etching processes. Furthermore, processes for removing both copper and barrier/glue layers from the field regions in one step may also be employed.

During CMP, the plated wafer surface is pressed on a moving polishing pad or a polishing belt and planarized while the wafer is rotated. As mentioned above, this process electrically isolates the copper deposited into various features on a given interconnect level. After repeating these processes several times, multi-level interconnect structures may be formed in which copper within via or contact features may electrically connect the various interconnect levels. However, the CMP processes can create problems with low-k dielectrics because of the mechanical force applied on the wafer surface during the processes. For instance, during CMP, the low-k materials may be stressed and delaminate or other defects may result due to the low mechanical strength or poor adhesion of the low-k materials. The longer the CMP process, these problems become more prominent. Accordingly, it is desirable to reduce the CMP time and force applied on the wafers, especially those using low-k insulators.

There are efforts to lower the force or pressure used in CMP processes. There is also efforts to employ etching or electroetching techniques instead of CMP to remove the copper overburden from the field regions of plated substrates.

The adverse effects of CMP may be minimized or overcome by employing a planar copper deposition approach that can provide thin layers of planar copper on the workpiece surface. One such planar deposition technique is the Electrochemical Mechanical Deposition (ECMD) method. In one aspect of ECMD, a workpiece-surface-influencing device (WSID) such as a mask, pad or a sweeper is used during at least a portion of the electrodeposition process when there is physical contact and relative motion between the workpiece surface and the WSID. Descriptions of various planar deposition methods and apparatus can be found in the following patents and pending applications, all commonly owned by the assignee of the present invention: U.S. Pat. No. 6,176,992 entitled "Method and Apparatus for Electrochemical Mechanical Deposition"; U.S. application Ser. No. 09/740,701 entitled "Plating Method and Apparatus that Creates a Differential Between Additive Disposed on a Top Surface and a Cavity Surface of a Workpiece Using an External Influence," filed on Dec. 18, 2001, now U.S. Pat. No. 6,534,116; and U.S. application Ser. No. 09/961,193 entitled "Plating Method and Apparatus for Controlling Deposition on Predetermined Portions of a Workpiece," filed on Sep. 20, 2001, now U.S. Pat. No. 6,921,551. The methods disclosed in these patent/applications can be used to deposit metals in and over cavity sections on a workpiece in a planar manner.

Using ECMD methods, the workpiece surface is wetted by the electrolyte and is rendered cathodic with respect to an electrode, which is also wetted by the electrolyte. This results in material deposition on the surface of the workpiece. These techniques can also be used for electroetching by reversing the polarity of the applied voltage and rendering the workpiece surface more anodic compared to the electrode. Very thin planar deposits can be obtained by first depositing a planar layer using an ECMD technique and then electroetching this planar film in the same electrolyte or in a special electro-etching or electro-polishing solution by reversing the applied voltage. In this manner, the thickness of the deposited layer may be reduced in a planar manner. In fact, this etching process can occur until all/most of the metal on the field regions are removed. It should be noted that a WSID may or may not be used during the electro-etching process since planar etching can be achieved with or without the WSID.

In greater detail, during ECMD, the workpiece surface is pushed against the surface of the WSID or vice versa for at least portion of the time when the surface of the workpiece is swept by the WSID. Planar deposition occurs due to the sweeping action as described above. It is also desirable to reduce the force applied on the workpiece surface by the sweeper surface, especially for workpieces with structurally weak low-k materials. When the force is reduced, however, the integrity of the contact between the workpiece surface and the sweeper surface need to be preserved. In other words, this physical contact needs to be uniform and repeatable for optimal results. Accordingly, there is need for an improved ECMD method and apparatus for minimizing the force applied to the substrate surfaces during planar metal deposition or electroetching while keeping this force uniformly distributed over the sweeper area.

SUMMARY OF THE INVENTION

The present invention discloses an electrochemical mechanical processing system for uniformly distributing an applied force to a workpiece surface. The system includes a workpiece carrier for positioning or holding the workpiece surface and a workpiece-surface-influencing-device (WSID). The WSID is used to uniformly distribute the applied force to the workpiece surface and includes, in one embodiment, a flexible top layer, a rigid bottom layer, and a compressible intermediate layer disposed in between the top layer and the bottom layer. The flexible top layer makes contact with the workpiece surface. The flexible top layer can be a single layer or a composite layer. The composite layer can further include an abrasive upper layer and a lower layer.

In another embodiment, the present invention discloses a system that includes a WSID having a first compressible layer and a second compressible layer, a rigid support layer disposed in between the first and second compressible layers, and a flexible layer attached to the first compressible layer, where the flexible layer makes contact with the workpiece surface.

Additional embodiments are disclosed in the present invention and are described in greater detail below, including methods for using the present invention.

BRIEF DESCRIPTIONS OF THE DRAWINGS

These and other objects and advantages of the present invention will become apparent and more readily appreciated from the following detailed descriptions of the presently preferred embodiments of the invention taken in conjunction with the accompanying drawings, of which:

DESCRIPTION OF THE PREFERRED EMBODIMENTS

The present invention will now be described in greater detail, which will serve to further the understanding of the preferred embodiments of the invention. As described elsewhere herein, various refinements and substitutions of the various embodiments are possible based on the principles and teachings herein.

The preferred embodiments or the present invention will be described with reference to FIGS. 1-8, wherein like components, structures, layers, etc. are designated by like reference numbers throughout the various figures. Further, specific parameters are provided herein, which are intended to be explanatory rather than limiting.

The preferred embodiments will be described using the example of fabricating interconnects for integrated circuit applications. It should be noted that present invention can be used to fill recesses, also referred to as cavities, on any workpiece having various electroplated materials, such as Au, Ag, Ni, Pt, Pd, Fe, Sn, Cr, Pb, Zn, Co and their alloys. The cavities can be filled with the above-mentioned materials, and different applications such as packaging, flat panel displays, and magnetic heads can be used with the present invention.

In one embodiment of the present invention, a planar conductive layer is formed on a wafer surface by a low-force ECMD process using a novel workpiece-surface-influencing device (WSID) structure, which applies a uniform and low force to the wafer surface. Other structures may also be formed using low-force electrochemical mechanical etching (ECME) process. In the following descriptions, both ECMD and ECME processes are referred to as electrochemical mechanical processing (ECMPR) since both processes involve electrochemical processes and mechanical action.

Figure 1A:
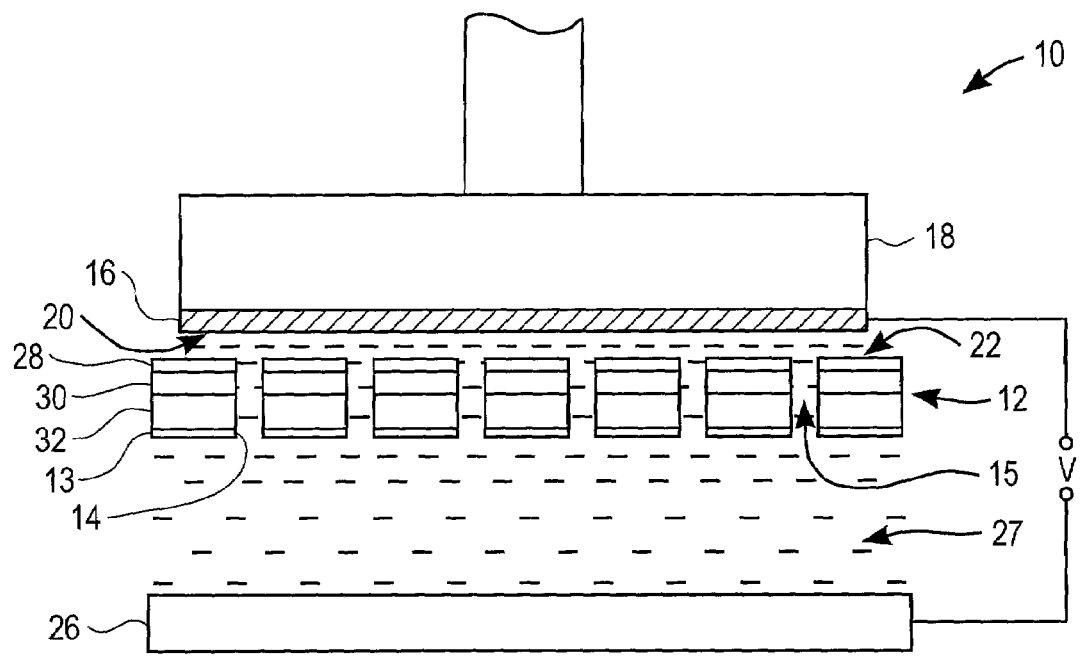
FIG. 1A illustrates a conventional electrochemical mechanical processing system.

FIG. 1A illustrates a conventional electrochemical mechanical processing system that can be used in accordance with the present invention. The ECMPR system 10 includes a conventional WSID 12 having openings 15 disposed in close proximity to a workpiece or wafer 16. A support plate 13, which may be porous, supporting the WSID 12 includes openings or perforations 14. In this example, showing ECMD, the wafer 16 is a silicon wafer, which is to be plated with a conductor metal such as copper or copper alloy. A wafer carrier 18 holds the wafer 16 such that the front surface 20 of the wafer 16 is positioned against the top surface 22 of the WSID 12. The openings 15 are designed to assure uniform deposition of copper from an electrolyte solution 24 onto the front surface 20. If electroetching, or ECME is used, uniform electroetching from the front surface 20 will occur, using either a deposition solution or an electroyte solution or an etching solution or an electrolyte solution. The top surface 22 of the WSID 12 facing the front surface 20 of the wafer 16 is used as the sweeper and the WSID 12 itself establishes solution and electric field flows to the front surface 20 for global and uniform deposition or etching.

The ECMPR system 10 also includes an electrode 26, which is immersed in the solution 24. The solution 24 is in fluid communication with the electrode 26 and the front surface 20 of the wafer 16 through the openings 15 in the WSID 12. The electrode 26 is typically a Cu material for Cu deposition. The electrode 26 may also be an inert electrode made of, for example, Pt coated Ti. An exemplary copper electrolyte solution may be copper sulfate solution with additives such as accelerators, suppressors, leveler, chloride and such, which are commonly used in the industry.

During operation, the top surface 22 of the WSID 12 sweeps the front surface 20 of the wafer 16 at least during part of the process. It should be noted that WSID 12 does not have to make contact at all times during ECMPR. For deposition of a planar film such as copper, the front surface 20 of the wafer 16 is made more cathodic (negative) compared to the electrode 26, which becomes the anode. For electroetching, the wafer surface is made more anodic than the electrode 26.

The WSID 12 may include a top layer 28, an intermediate layer 30, and a bottom layer 32. The top layer 28 may be made of an abrasive material such as a fixed-abrasive-film supplied by the 3M company or any of the other so-called pad materials used in CMP applications, such as the polymeric IC-1000 material supplied by Rodel. The thickness of the top layer 28 may be typically in the range of 0.1-2.0 mm. Next, the intermediate layer 30 is the mounting layer for the top layer 28. The intermediate layer 30 is typically made of a hard plastic material such as polycarbonate with a thickness range of 1.0-3.0 mm. Finally, the bottom layer 32 is used as a compression layer for the complete structure. The bottom layer 32 is generally made of a polymeric foam material such as polyurethane or polypropylene with typical compression strength that requires about 10-20 psi of pressure to deflect the foam by about 25% of its original thickness, which typically may be in the range of 2.0-5.0 mm. The U.S. application Ser. No. 09/960,236 filed on Sep. 20, 2001, entitled "Mask Plate Design," also assigned to the same assignee as the present invention, discloses various WSID embodiments.

As previously mentioned in the Background Section, although planar deposition of thin conductor layers, such as thin copper layers, is attractive for low-k dielectric applications, substrates containing low-k materials should not be subjected to high-stress. The conventional WSID 12 may be used for processing wafers with low-k dielectrics by reducing the pressure at which the wafer surface is pushed against the WSID 12. Thus, pressure may be reduced to so as not to damage the low-k materials. However, as the overall pressure in the ECMPR system 10 is reduced, this may not necessarily eliminate the possibility of high local pressure points on the wafer 16. The WSID 12 is a globally flexible structure due to the existence of the bottom layer 32, which is a relatively hard foam, but it is not necessarily locally flexible due to the presence of the intermediate layer 30. In the case of a relatively thick top layer (thicker than 0.5 mm.), the overall rigidity of the WSID structure is increased. The WSID 12 shown in FIG. 1A provides global and uniform contact between the surface of the WSID 12 and the front surface 20 of the wafer 16. However, locally, the situation may be different. If the flatness of the WSID 12 and the front surface 20 of the wafer 16 is not perfectly flat or these two surfaces are not perfectly parallel, then some surfaces on the wafer 16 will be exposed to higher pressure than the other surfaces during processing, especially when the surface of the wafer 16 is first brought into contact with the surface of the WSID 12. If, for example, the parallelism is not absolute, as the wafer surface is lowered onto the sweeper surface, one section of the wafer surface may initially contact the sweeper surface. This section of the wafer surface is then exposed to higher pressure since the applied force is constant and the sweeper is rigid.

Figure 1B:
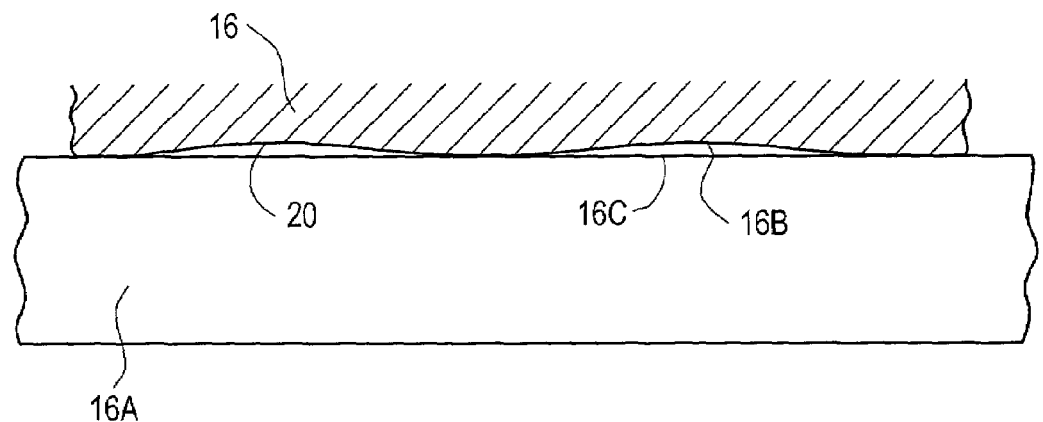
FIG. 1B illustrates a section of a wafer in contact with a conventional sweeper structure.

FIG. 1B illustrates a section of a wafer in contact with a conventional sweeper structure. In FIG. 1B, an exemplary section of the wafer 16 is in contact with the sweeper structure 16A. As shown, the wafer 16 may have a non-flat top surface 20. The top surface 20 may comprise a field region, and the field region may contain therein recesses or cavities. The top surface may or may not contain an already deposited conductive layer. This non-flat surface can be caused by a number of factors, including bowing of or other stress applied to the wafer as it is being held by a wafer carrier, lack of parallelism between the sweeper structure 16A and the wafer 16, or non-flat topography of the field region.

When the conventional sweeper structure 16A is used to process the wafer 16, the contact area between some sections of the wafer surface 20 and the sweeper surface are not uniform, and thus the pressure is non-uniform. Particularly, in sections 16B, a gap exists between the wafer surface 20 and the sweeper surface 16C, and the pressure applied to the wafer surface at this section is nonexistent. This results in non-uniformity in sweeping efficiency over the entire wafer surface with high pressure points at locations where the wafer surface makes contact with the sweeper surface. In addition, defects may be present as a result. Local high force application on the wafer surface may also result in stressed and peeled areas especially if the wafer surface has mechanically weak layers such as low-k materials.

Figure 1C:
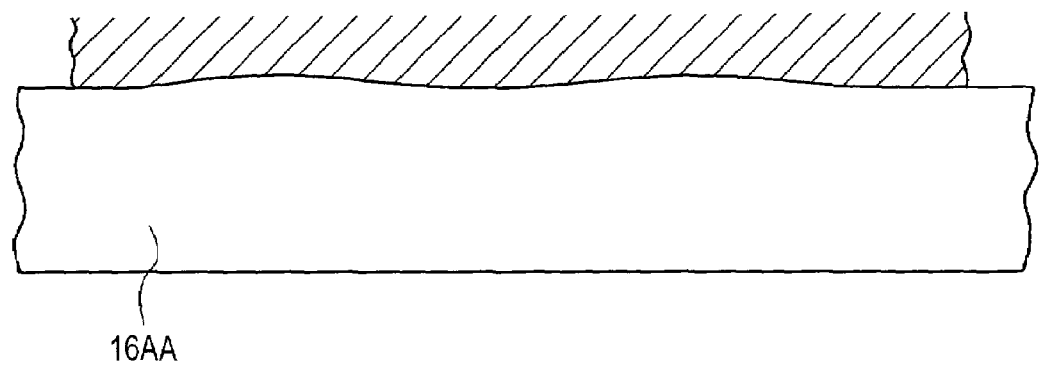
FIG. 1C illustrates a section of a wafer in contact with a sweeper structure in accordance with the present invention.

FIG. 1C illustrates a section of a wafer in contact with a sweeper structure in accordance with the present invention. The sweeper structure 16AA of the present invention is softer and more flexible than conventional sweeper structures. Using the sweeper structure 16AA, a more uniform and global contact can be made with the wafer surface. In other words, the sweeping efficiency is uniform and the force is uniformly distributed. Thus, during use with a low force, typically about or less than 1.0 psi, and preferably less than 0.5 psi or lower, contact can globally occur between the sweeper structure 16AA and the wafer 16, irrespective of whether the wafer 16 is not flat due to bowing of or other stress applied to the wafer as it is being held by a wafer carrier, lack of parallelism between the sweeper and the wafer, or non-planar topography of the field region.

Figure 2A:
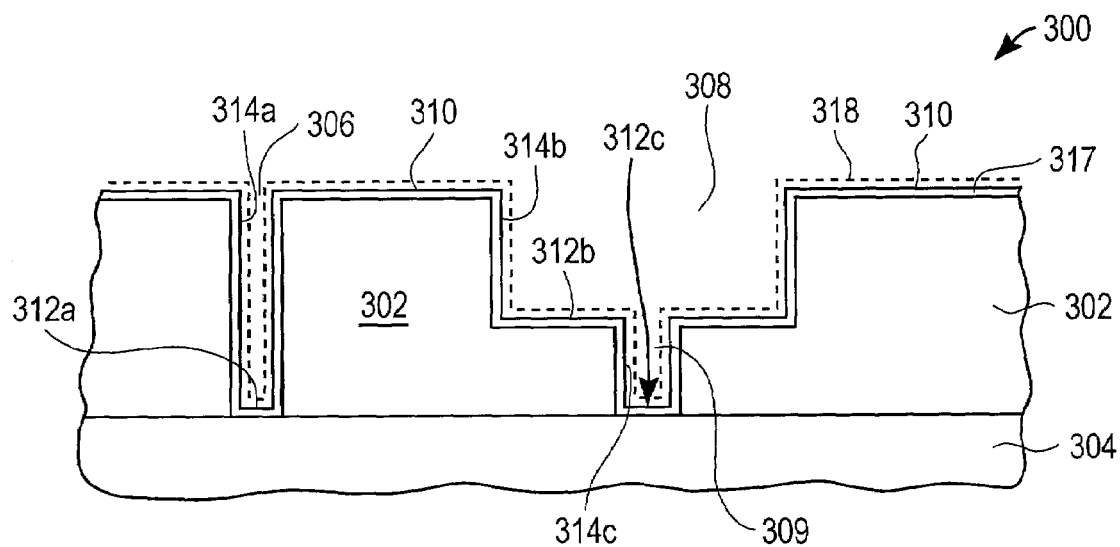
FIG. 2A illustrates a more detailed section of a conventional wafer surface.

FIG. 2A illustrates a more detailed section of a conventional wafer surface. The wafer substrate 300 includes a patterned layer 302, preferably an insulating layer, formed on a wafer 103 (see FIG. 3A). The patterned layer 302 may include an insulator such as a low-k dielectric material and can be formed using well-known patterning and etching techniques pursuant to metal interconnect design rules. The patterned layer 302 can include cavities or gaps, namely the first cavity 306 and a second cavity 308, separated from one another by a field region 310. The cavities can be formed such that the first cavity 306 may be a via and the second cavity 308 may be a trench having a second via 309. The via 306 is defined by a bottom wall 312a and side walls 314a. The trench 308 is defined by a bottom wall 312b and side walls 314b with the second via 309 defined by a bottom wall 312c and side walls 314c.

One or more thin layers of barrier or glue layer 317 having materials, for example, Ta, TaN, Ti, TiN, or WN coat the cavities as well as the top surfaces of the substrate 300. A thin film 318 of copper is coated as the seed layer on top of the barrier layer 317 for the subsequent electroplated copper layer. The copper seed layer 318 provides a base for which nucleation and growth of the subsequent deposition can occur.

Figure 2B:
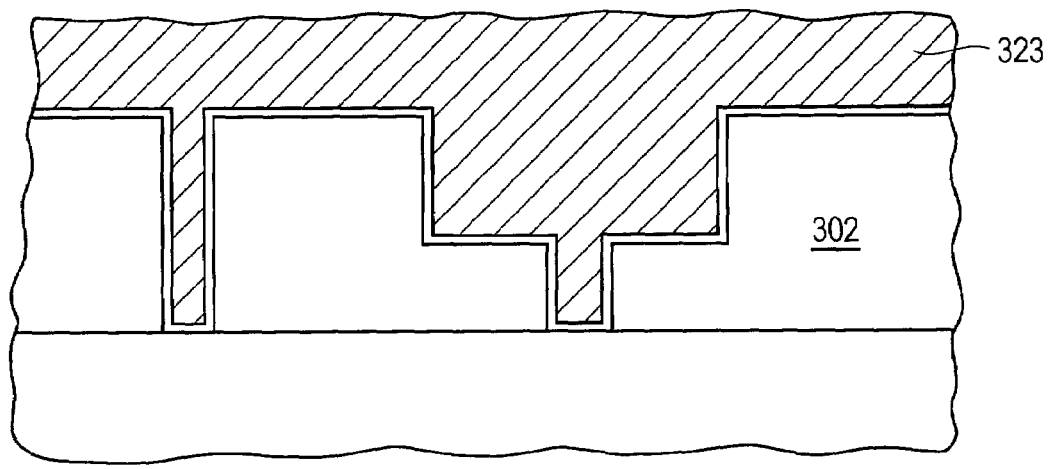
FIG. 2B illustrates the wafer surface of FIG. 2A having a planar copper layer deposited thereon.

FIG. 2B illustrates the wafer surface of FIG. 2A having a planar copper layer deposited thereon. A planar copper layer 320 can be deposited into the cavities 306, 308, 309 and on the field region 310. The deposition process is performed using the present invention described in greater detail below.

Figure 3A:
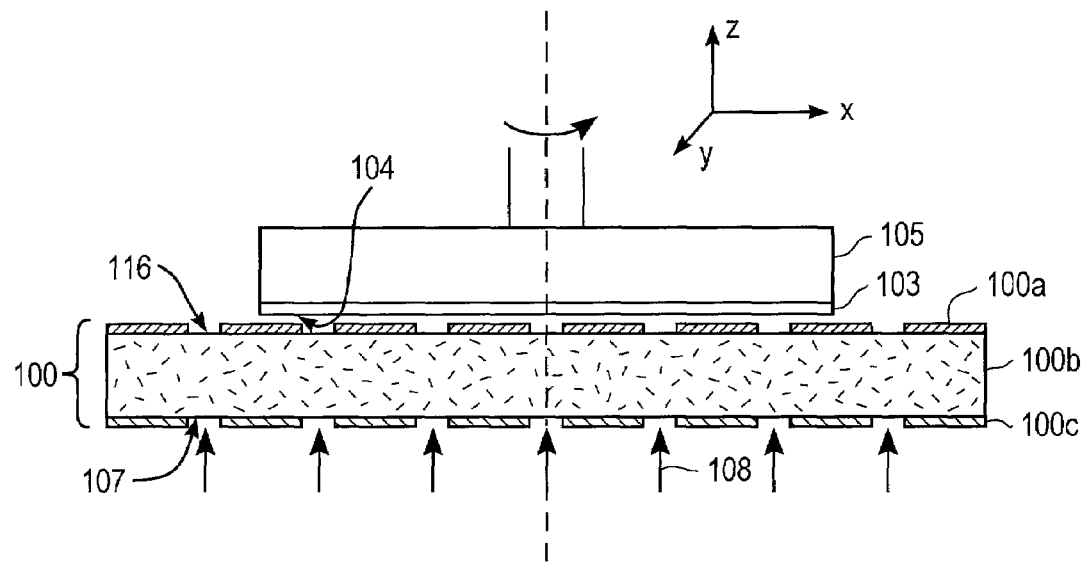
FIG. 3A illustrates a workpiece-surface-influencing device in accordance with the present invention.

FIG. 3A illustrates a workpiece-surface-influencing device (WSID) in accordance with the present invention. The WSID 100 is disposed in close proximity to a workpiece or wafer 103 held by a wafer carrier 105. The wafer carrier 105 is adapted to rotate about the z-axis and move the wafer 103 laterally in the x and y directions. In this embodiment, the wafer carrier 105 is stabilized such that it does not move gimbal during the process. During operation, the front surface 104 of the wafer 103 is generally perpendicular to the z-axis. Further, FIG. 2A illustrates a detailed illustration of the front surface 104 of the wafer 103. The WSID 100 of the present invention and the wafer carrier 105 may be implemented within the conventional ECMPR system 10.

Figure 3B:
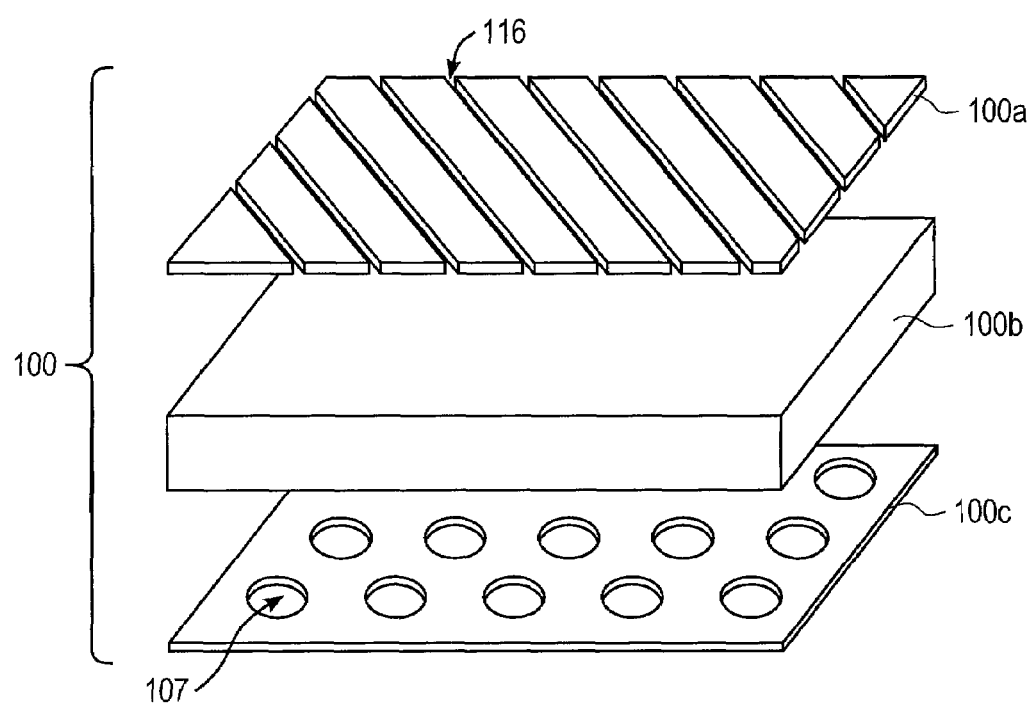
FIG. 3B illustrates a perspective view of the workpiece-surface-influencing device in accordance with the present invention.

FIG. 3B illustrates a perspective view of the workpiece-surface-influencing device in accordance with the present invention. The WSID 100 includes a top layer 100a, an intermediate layer 100b, and a bottom layer 100c. In this embodiment, the top layer 100a may be a thin flexible film that is attached to the intermediate layer 100b. The top layer 100a may be a single layer or a composite layer (i.e., more than one layer). For example, if the top layer 100a includes more than one layer, the layers may not be the same size. However, the total thickness of such composite layers should be less than 0.5 mm, and preferably less than 0.2 mm. For example, FIG. 3D illustrates a composite layer structure 170 of the WSID. The composite layer structure 170 includes an upper layer 172 and a lower layer 174. In this example, it is desirable that the upper layer 172 be abrasive.

Figure 3C:
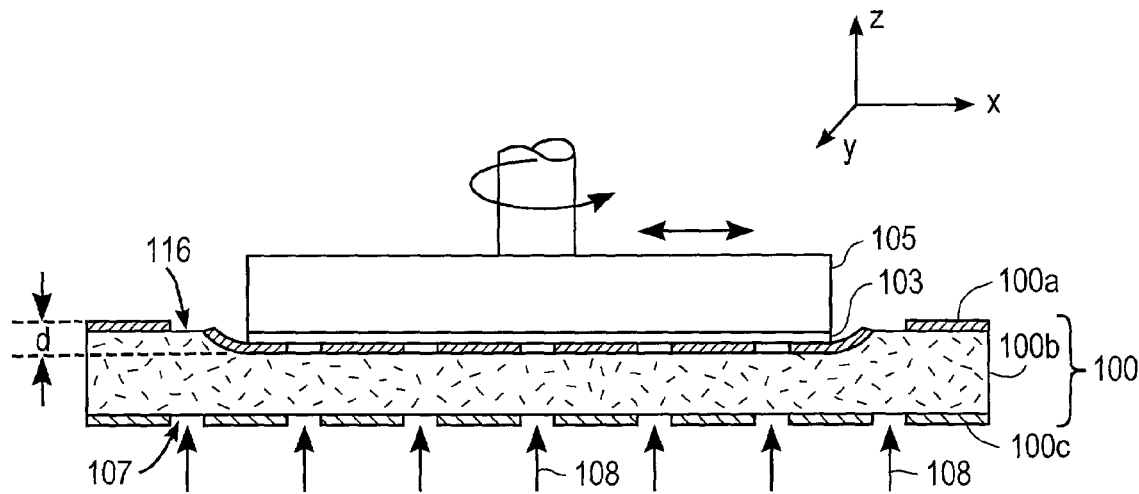
FIG. 3C illustrates the workpiece-surface-influencing device during operation in accordance with the present invention.
Figure 3D:
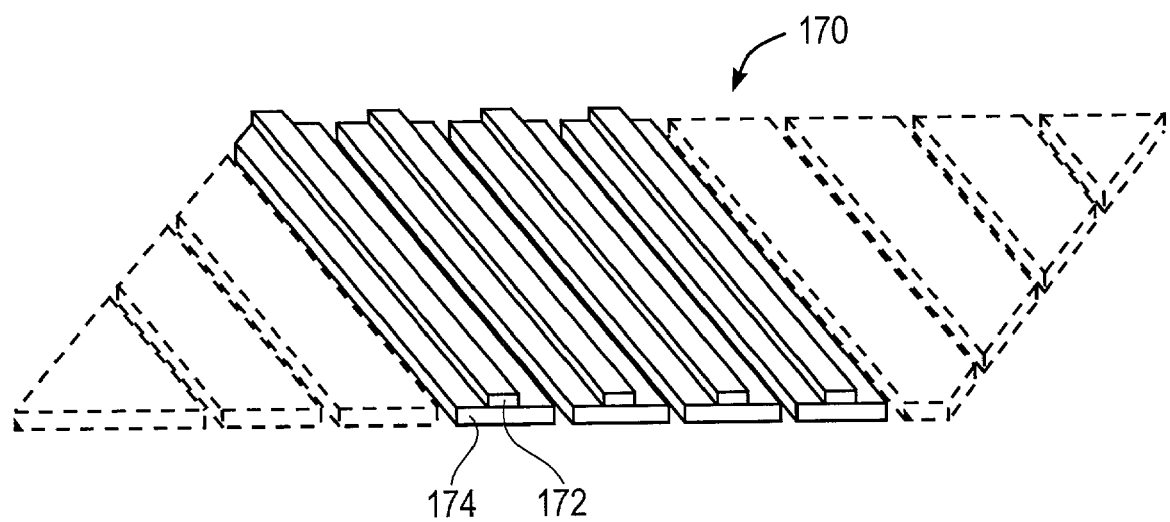
FIG. 3D illustrates an example of a composite layer structure of the workpiece-surface-influencing device in accordance with the present invention.

FIG. 3C illustrates the workpiece-surface-influencing device during operation in accordance with the present invention. Referring now to FIGS. 3A-3C, the intermediate layer 100b is compressible and soft and attached to the top section of the bottom layer 100c. The bottom layer 100c is a support layer, which is sufficiently rigid to support the intermediate layer 100b and the top layer 100a. The bottom layer 100c can be a porous plate and can include openings 107 to allow the electrolyte solution and electric field to freely flow towards the substrate surface. In some embodiments, the bottom layer 100c can be an electrode. During operation, an electrolyte solution 108 containing the ionic species of the metal to be deposited and additives for quality film formation makes contact with the electrode and the wafer surface 104.

The top layer 100a is a flexible layer that has a thickness of less than or equal to about 0.5 mm, and preferably less than or equal to about 0.2 mm. The top layer 100a may have relatively flat surface such as the lapping films containing 0.05-0.5 micron size abrasive particles (available from e.g. Buehler or 3M companies), or small diameter posts with flat tops or pyramidal posts such as those employed in fixed abrasive pads provided by 3M company. The surface of the top layer 100a is preferably abrasive to efficiently sweep the surface of the wafer. Flexibility of the top layer 100a is critical. In other words, the top layer 100a should be flexible enough to fully conform to the wafer surface even if the wafer surface is not absolutely flat as illustrated in FIG. 1C.

The top layer 100a also includes openings or channels 116, which may have any form or size for uniform copper deposition on the wafer 103. The openings 116 can have any shape so long as they allow fluid to flow between the wafer 103 and the electrode (not shown) through the WSID 100. Although the WSID 100 illustrated in FIGS. 3A and 3B has a rectangular shape, it may be shaped in many other geometrical shapes such a small-area sweeper disclosed in the U.S. patent application Ser. No. 09/961,193, filed on Sep. 20, 2001, now U.S. Pat. No. 6,921,551, entitled "Plating Method and Apparatus for Controlling Deposition on Predetermined Portions of a Workpiece"and commonly owned by the assignee of the present invention.

The intermediate layer 100b is made of a foam or gel-type material, which is easily compressible under an applied force, but retains its original shape once the force unapplied. Examples of such materials can be polyurethane, polypropylene, polyethylene, rubber, ethyl vinyl acetate, polyvinyl chloride, polyvinyl alcohol, ethylene propylene diene methyl, combinations thereof, and the like. The intermediate layer 100b may include many interconnected open pore networks, which allow electrolyte to percolate through them in the direction of the arrows 108. In this embodiment, the intermediate layer 100b includes an open pore structure. The compression strength of the intermediate layer 100b should be such that the layer 100b can compress about 25% under a testing force of about 1-10 psi, which testing force will go above the low force that is used during the processes of the present invention.

During operation, the intermediate layer 100b should compress by an amount less than 2 mm, but preferably less than 1 mm so that in case the wafer holder is moved in either x or y direction, the edge of the wafer does not damage the top layer 100a. Therefore, the thickness of the intermediate layer 100b should be selected accordingly. For example, for a compression of 1 mm during operation, if a foam with a compression strength (for 25% deflection) of 1 psi is selected, the thickness of the intermediate layer 100b should be about 4 mm, if a pressure of 1 psi is desired. However, since lower pressures are normally desired in low-force ECMD process, the thickness of the foam is typically larger (in this example it may be 10-20 mm) or the foam selected typically has lower compression strength. The relationship between the force exerted by the intermediate layer 100b onto the wafer surface and the compression amount (shown as "d" in FIG. 3C) is substantially linear with force increasing linearly with the level of compression for a given foam, although it may be non-linear.

As previously mentioned, the exemplary ECMPR system 10 is capable of performing planar or non-planar plating as well as planar or non-planar electroetching. In this respect, if non-planar process is desired, the wafer surface 104 can be brought near the top layer 100a of the WSID 100, but no contact is preferably made so that non-planar metal deposition can occur.

Further, if planar process is desired, the wafer surface 104 makes contact with the top layer 100a as a relative motion is established between the top layer 100a and the wafer surface 104. As the solution, depicted by arrows 108, is flowed through the open pores of the intermediate layer 100b and the channels 116 through the top layer 100a, the wafer 103 is moved, i.e., rotated and/or laterally moved, while the wafer surface 104 makes contact with the top layer 100a. Under an applied potential between the wafer 103 and an electrode, and in the presence of the solution that flows through the WSID 100, metal such as copper is plated on or etched off the wafer surface 104, depending on the polarity of the voltage applied between the wafer surface and the electrode. As the top layer 100a makes contact with the wafer 103, the top layer 100a conforms to the wafer surface 104 and provides uniform contact and pressure.

As described earlier, the low-k dielectrics are not mechanically stable and may not withstand high compressive forces such as above 1 psi during the process. Due to the compressibility of the WSID 100, less pressure can be applied in a uniform manner on such low-k interlayers during planar deposition of copper layers. As shown in FIG. 3C, as the wafer 103 is brought in contact with the top layer 100a, the force applied on the wafer 103 may be controlled by compressing the intermediate layer 100b towards the bottom layer 100c. As indicated above, the force exerted onto the wafer surface increases with increased "d." Due to the flexibility of the top layer 100a and the compressibility of the intermediate layer 100b that is supporting the top layer 100a, the WSID 100 is globally and locally flexible. This structure allows locally and globally uniform and low pressure contact between the front surface of the wafer and the flexible top layer 100a. The global and local contact stages between the WSID 100 and the wafer 103 may occur simultaneously.

Referring again to FIG. 3C, as the wafer carrier 105 is lowered towards the WSID 100, the WSID 100 is first compressed with the wafer carrier 105 moving downwardly. The wafer carrier 105 flexes the top layer 100a and compresses the intermediate layer 100b. At this point, an instantaneous uniform global contact may be established between the top layer 100a. Then, as the intermediate layer 100b tries to recover back to its original shape, the intermediate layer 100b applies a counter force to the wafer 103 through the top layer 100a. As being positioned between these two oppositely acting forces, the top layer 100a conforms or locally contacts the wafer surface 104 during this process.

For the purpose of clarification, the above described process requires two stages. It is understood that the local contact between the wafer surface 104 and the top layer 100a may be established in a simultaneous fashion as the wafer carrier 105 is pushed towards the WSID 100. Also, as to the low pressure aspect of the process, as the wafer 103 is brought into contact with the WSID 100, the force applied by the wafer 103 causes the WSID 100 to compress by an amount "d." Because the wafer carrier 105 is stabilized, as it is moved, i.e., rotated and laterally moved, on the WSID 100, "d" does not vary. If "d" is small, the force applied onto the wafer surface by the WSID 100 will also be small. As "d" increases, force will get larger and larger. By choosing the compression strength of the intermediate layer 100b and the distance "d" the wafer is pushed against the top layer 100a, any amount of pressure in the range of 0.01-1 psi or higher can be applied to the wafer surface in a uniform manner. As previously mentioned, the preferred value of "d" is less than 1 mm, since if "d" is too large and the wafer in FIG. 3C is translated in lateral direction, the edge of the wafer would move against the surface of the flexible layer 100a and eventually cause damage. Therefore, it is preferred to select the compressibility value for the compressible layer 100b such that the desired pressure or force applied to the wafer surface results in the distance "d" to be less than 2 mm.

The wafer carrier 105 used in this example is stabilized and does not gimbal during the process. Using a gimballing head structure such as the one described in U.S. patent application Ser. No. 09/472,523, filed on Dec. 27, 1999, now U.S. Pat. No. 6,612,915, entitled "Work piece Carrier Head for Plating or Polishing," the present invention can be practiced by loading a wafer on the gimballing head and applying a predetermined pressure on the chuck-face holding the wafer. The wafer is then lowered towards the WSID 100 and pushed against the top layer 100a until gimballing action becomes operable. In this case, the force on the wafer surface is determined by the pressure applied onto the gimballing chuck by the wafer carrier 105. The flexible and compressible nature of the WSID 100 allows low pressures in the range of 0.01-1 psi be applied without loosing uniform contact between the wafer surface and the surface of the top layer 100a.

Figure 3E:
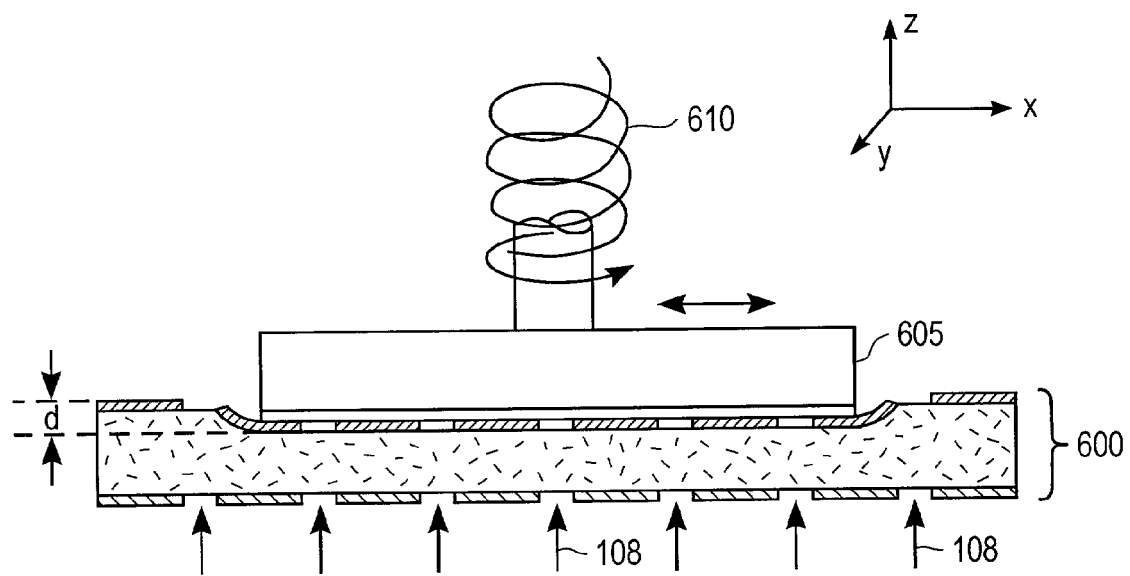
FIG. 3E illustrates another example of a wafer carrier in accordance with the present invention.

FIG. 3E illustrates another example of a wafer carrier in accordance with the present invention. The wafer carrier 605 is similar to wafer carrier 105 except that wafer carrier 605 includes a coil mechanism 610. The coil mechanism 610 ensures that a constant and desired low pressure is applied to the wafer. For example, when the WSID 600 is more rigid, the wafer carrier 605 having coil mechanism 610 enables a constant and desired low force to be applied to the wafer. Also, using the wafer carrier 605, the WSID 600 conforms to the wafer surface, as described above. As an example, if the WSID 600 (i.e., pad) is rated at 1-2 psi, then the coil mechanism 610 rated at less than 0.5 psi can be used such that a low force transferred to the carrier head 605 is also less than 0.5 psi. The coil mechanism 600 should allow the carrier head 605 to move principally in the vertical direction (z-direction).

Figure 4:
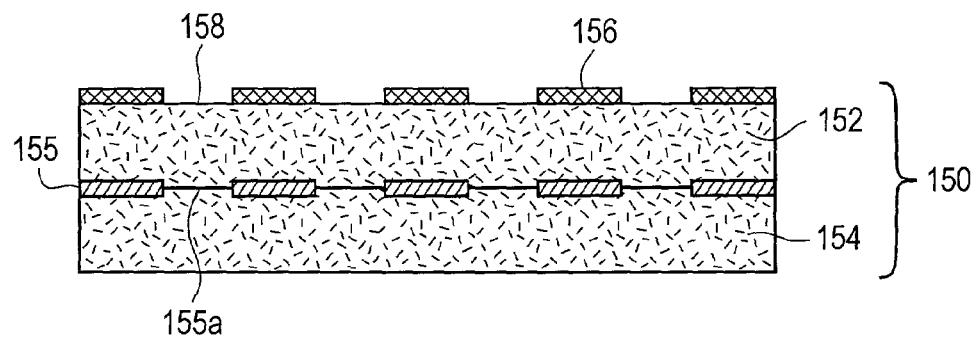
FIG. 4 illustrates another example of a workpiece-surface-influencing device in accordance with the present invention.
Figure 5A:
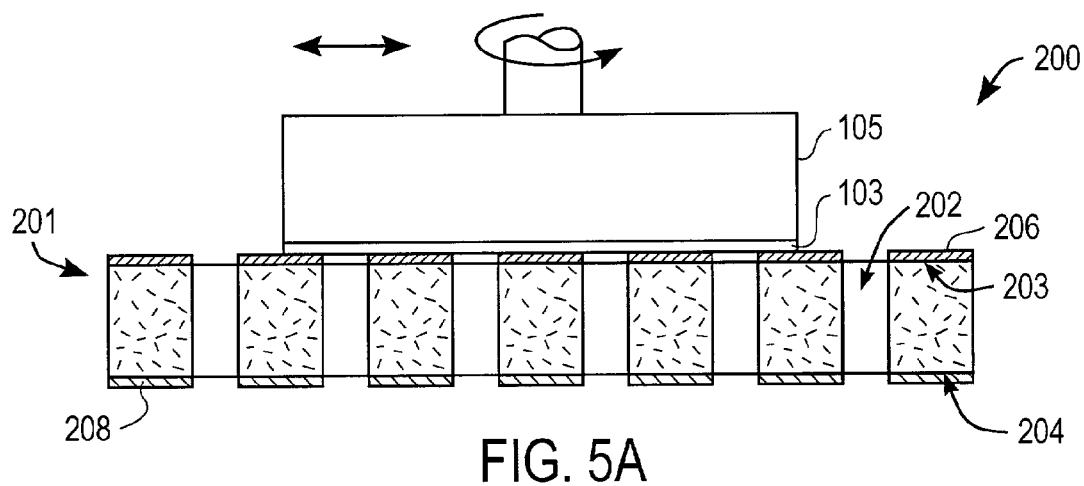
FIGS. 5A and 5B illustrate yet another example of a workpiece-surface-influencing device in accordance with the present invention.
Figure 5B:
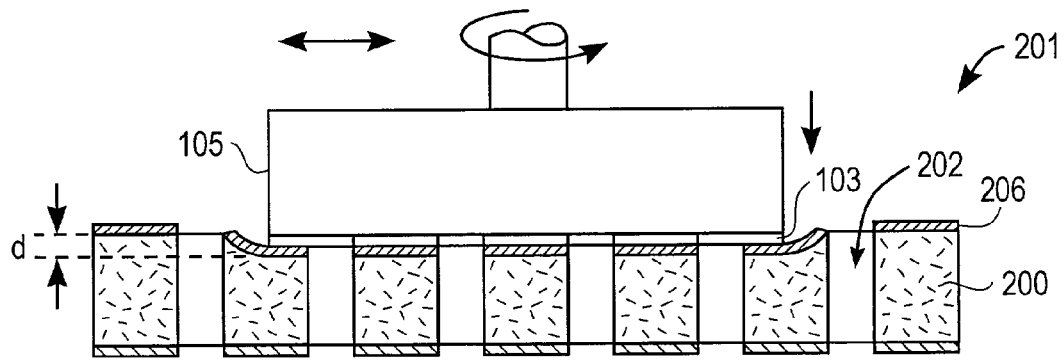

FIG. 4 illustrates another example of a workpiece-surface-influencing device in accordance with the present invention. The WSID may be configured in different forms and shapes. For example, a WSID 150 includes a first compressible layer 152 and a second compressible layer 154. The compressible layers 152, 154 may be made of a spongy material having open pore structure. In this embodiment, a rigid support layer 155 having openings 155a is interposed between the first and second compressible layers 152, 154. The openings 155a allow an electrolyte solution to flow from the second compressible layer 154 to the first compressible layer 152. The support layer 155 supports the WSID 150 and allows it to collapse uniformly when the wafer is pressed against it. As in the previous embodiment, the WSID 150 includes a top flexible layer 156 that is attached to the top of the first compressible layer 152. The flexible layer 156 sweeps the wafer surface during the plating process. Openings 158 in the flexible layer 156 allow electrolyte to flow from the first compressible layer 152 towards the wafer. It should be noted that two or more compressible layers and one or more support layers may be used herein. As the structure becomes thicker and thicker, it becomes softer and softer. In other words, when the wafer is pushed against the WSID 150 by a fixed distance "d", thicker stacks of compressible layers of a given type yield lower force on the wafer surface FIGS. 5A and 5B illustrate yet another example of a workpiece-surface-influencing device in accordance with the present invention. The WSID 201 includes a compressible layer 200 having channels 202 extending from a top surface 203 to a bottom surface 204 of the compressible layer 200. Although in this embodiment the compressible layer 200 may preferably be made of a closed-pore spongy material so that an electrolyte can be flowed through the channels 202, it can also be made of an open pore spongy material. A flexible layer 206 is attached to the top surface 203 of the compressible layer 200 while a support plate 208 is attached to the bottom surface 204. The channels 202 are continuous through the flexible layer 206 and the support plate 208. The flexible layer 206 may include a flexible fixed abrasive layer. The combination of both the flexible nature of the flexible layer 206 and the compressibility of the compressible layer 200 allows the wafer to establish uniform global and local contact with the WSID 201.

During operation, as shown in FIG. 5B, the carrier head lowers the wafer 103 against the WSID 201. The pressure applied by the wafer 103 causes the WSID 201 to decrease by distance "d". As in the previous embodiment, as "d" increases, or the WSID 201 continues to be pressed down, the pressure on the wafer surface increases. The channels 202 are designed to assure uniform deposition on or etching from the wafer surface. Again, as in the previous embodiments, the flexible layer 206 may be a composite layer of two or more layers.

Figure 6:
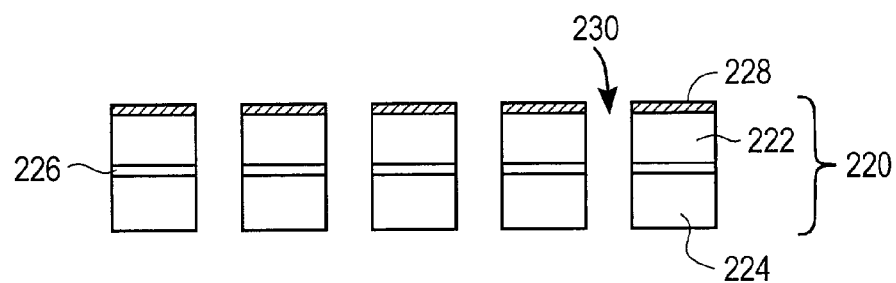
FIG. 6 illustrates still another example of the workpiece-surface-influencing device in accordance with the present invention.

The WSID 201 may be configured in different forms and shapes. For example, FIG. 6 illustrates still another example of the workpiece-surface-influencing device in accordance with the present invention. The WSID 220 includes a first compressible layer 222 and a second compressible layer 224. The compressible layers 222, 224 may be made of a spongy material having closed pore structure. In this embodiment, a rigid support layer 226 is interposed between the first and second compressible layers 222, 224. A flexible layer 228, preferably a flexible abrasive layer, is attached on top of the first compressible layer 222. Channels 230, which are formed through the layers 226, 224, 222 and 228 allow an electrolyte solution to flow thorough the WSID 220. The support layer 226 supports the WSID 220 and allows the WSID 220 to collapse uniformly when the wafer is pressed against it. More layers of compressible material and support material may also be used in such structure.

Figure 7A:
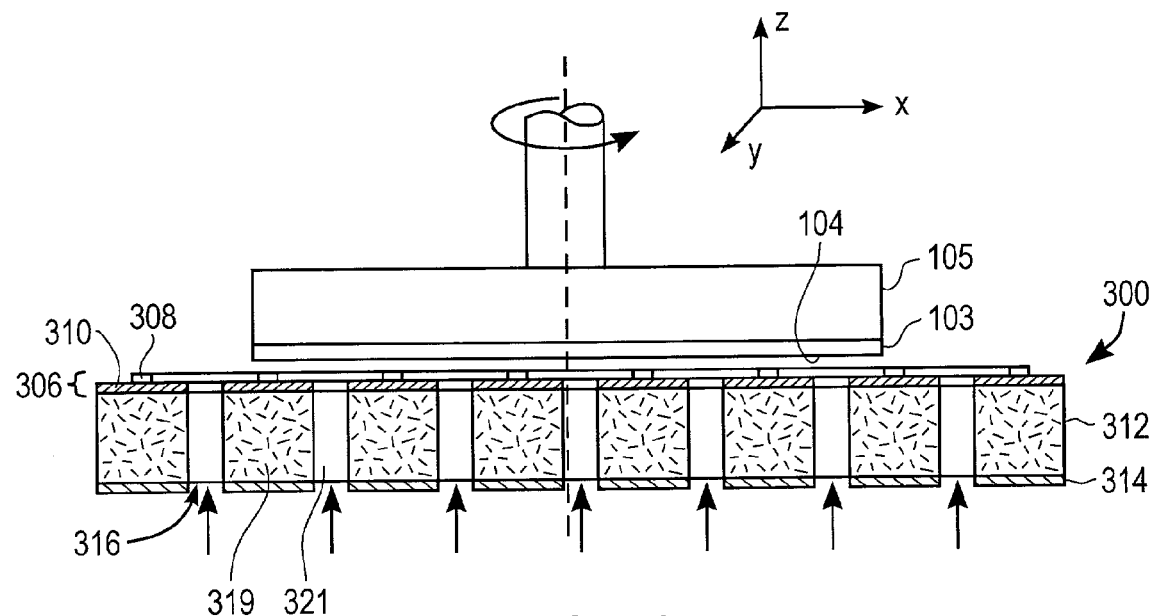
FIGS. 7A and 7B illustrate yet another example of a workpiece-surface-influencing device in accordance with the present invention.
Figure 7B:
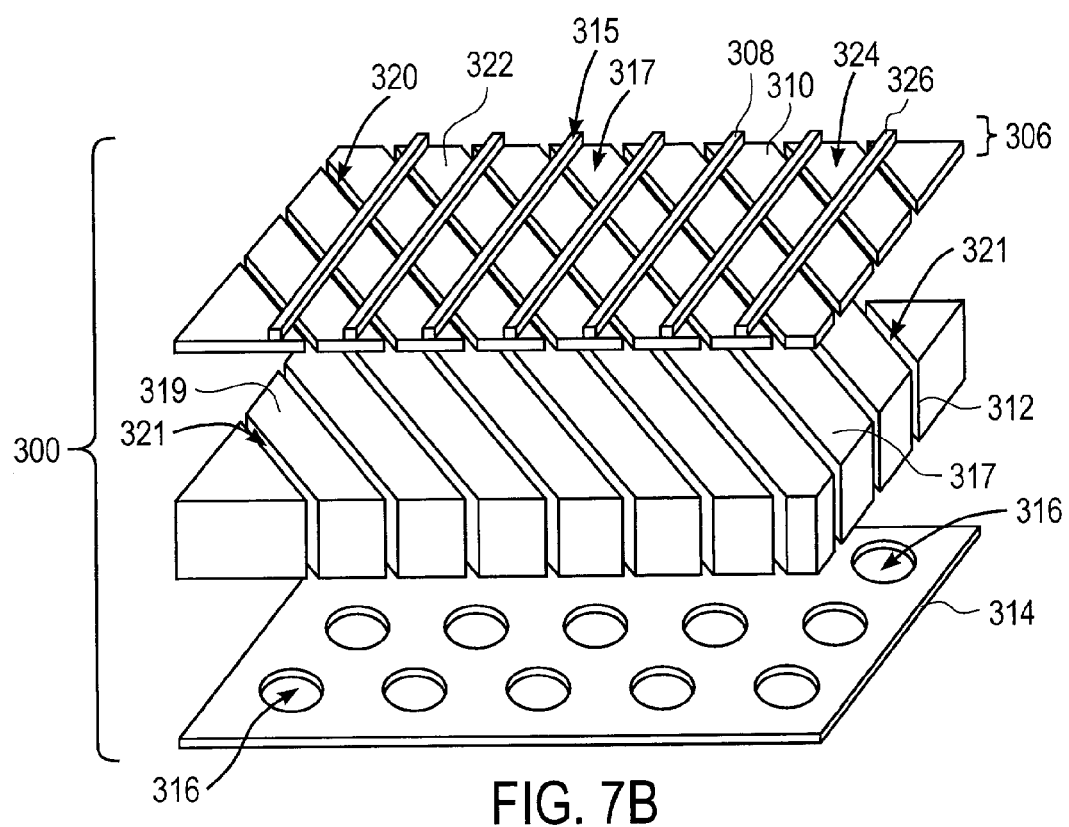

FIGS. 7A and 7B illustrate yet another example of a workpiece-surface-influencing device in accordance with the present invention. The WSID 300 is positioned in close proximity to the workpiece or wafer 103 held by the wafer carrier 105, which has similar characteristics as mentioned above. The WSID 300 includes a top layer 306 including a top film 308 and a bottom film 310, an intermediate layer 312, and a bottom layer 314. In this embodiment, the top film 308 and the bottom film 310 are made of thin flexible material layers. The top film with an upper surface 315 is attached to a top surface 317 of the bottom film 310, which in turn is attached to the top section of the intermediate layer 312. The intermediate layer 312 is placed on the bottom layer 314.

The top film 308 of the top layer 306 is preferably a flexible abrasive film (with abrasive surface) to efficiently sweep the wafer surface. Therefore, the top film 308 acts as a sweeper for ECMPR. The top film 308 may have a thickness in the range of 0.05-5 mm, preferably 0.1-1 mm, and may be a layer with relatively flat surface such as the lapping films containing 0.05-0.5 micron size abrasive particles (available from e.g. Buehler or 3M companies), or small diameter posts with flat tops or pyramidal posts such as those employed in fixed abrasive pads provided by 3M company. The bottom film 310 may be a thin film which may be made of Mylar or polycarbonate materials. The thickness of the bottom film 310 may be 0.01-2 mm depending on the flexibility desired. Flexibility of the top film 308 and hence the flexibility of the attached bottom film 310 are important for the practice of this invention. In one embodiment, the top layer 106 is flexible enough to fully conform to the wafer surface even if the surface is not absolutely flat.

The intermediate layer 312 is a compressible layer having openings or channels 321 extending from the bottom layer 314 to top layer 306. The channels allow process solution to flow through the WSID 300 and wet the surface of the wafer. In this embodiment, channels 321 are formed as slits between sections 319 of the compressible layer 312. Alternatively, the compressible layer 312 may have an open pore structure allowing fluid to flow between the top layer 306 and the bottom layer 314. The bottom layer 314 is a support layer, which is rigid enough to support the compressible layer 312 and the whole assembly.

The bottom film 310 includes a number of openings or channels 320. In this embodiment, the channels 320 are formed as parallel slits between strips 322 of the bottom film 310. The channel pattern of the bottom film 310 is preferably the same as the channel pattern of the compressible layer 314. The top film 308 includes channels 324 which are preferably formed as slits between strips 326 of the top film 308. The channels or slits 324 of the top film 308 may be larger than the ones in bottom film 310. The strips 326 of top film 308 is attached on the strips 322 of bottom 310 film in a crosshatch or mesh configuration.

The crosshatch configuration allows for a more rigid and stable top layer 306 as the top layer 306 makes contact with the wafer 103, and can be used with our without the low force techniques described herein. In other words, when the top film 308 substantially intersects the channels 320 of the bottom film 310, this provides for a more rigid top layer 306. Otherwise, if the top film 308 does not intersect the channels 320 of the bottom film 310, then the films making up the top layer 306 can be distorted when it makes contact with the wafer 103.

Another advantage of the cross hatch structure is that a layer with the cross hatch structure assists in uniformly distributing the solution across the wafer surface. The solution flows through the compressible layer 312 and fills the channels 320 in the bottom film 310 and then fills the channels 324 in the top film 308. The process solution which is instantaneously and continuously held in these channels provides an efficient and uniformly distributed solution supply for the wafer. Cross hatching and vertically stacked channel network allows process solution to flow without restriction on the surface of the WSID 300.

Figure 7C:
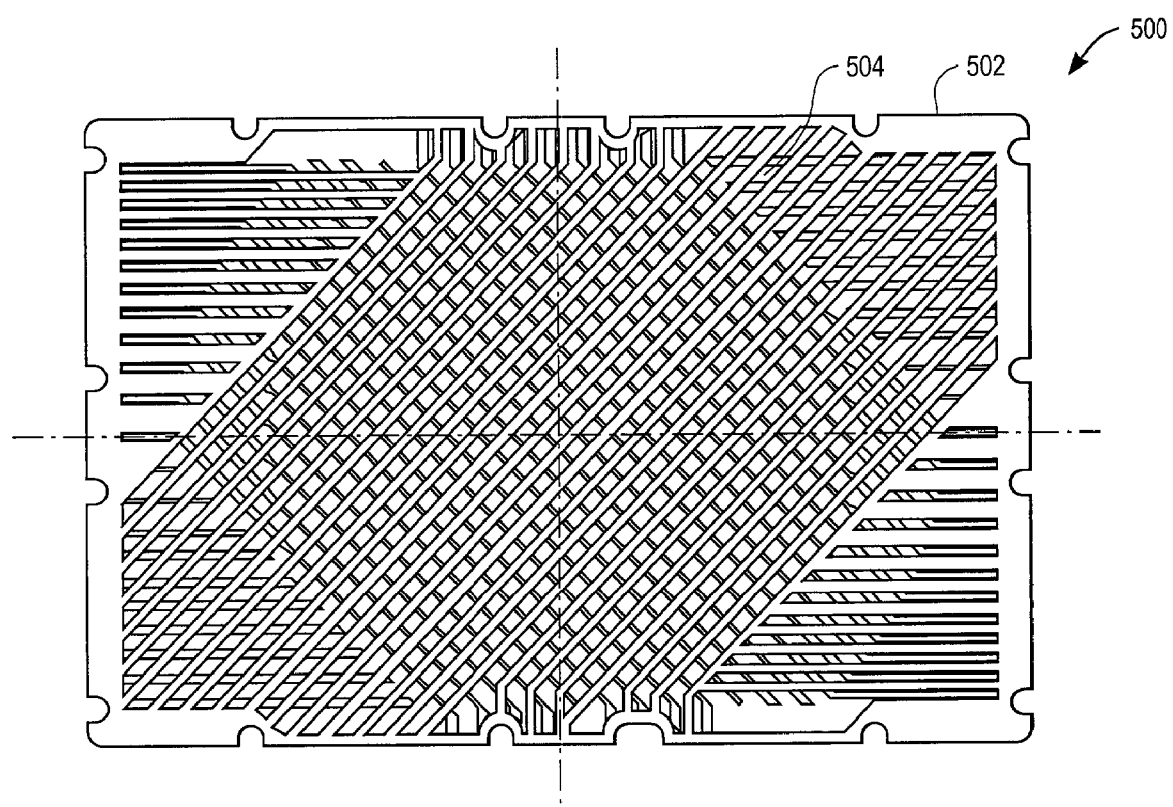
FIG. 7C illustrates an example of a top layer structure of the workpiece-surface-influencing device in accordance with the present invention.
Figure 7D:
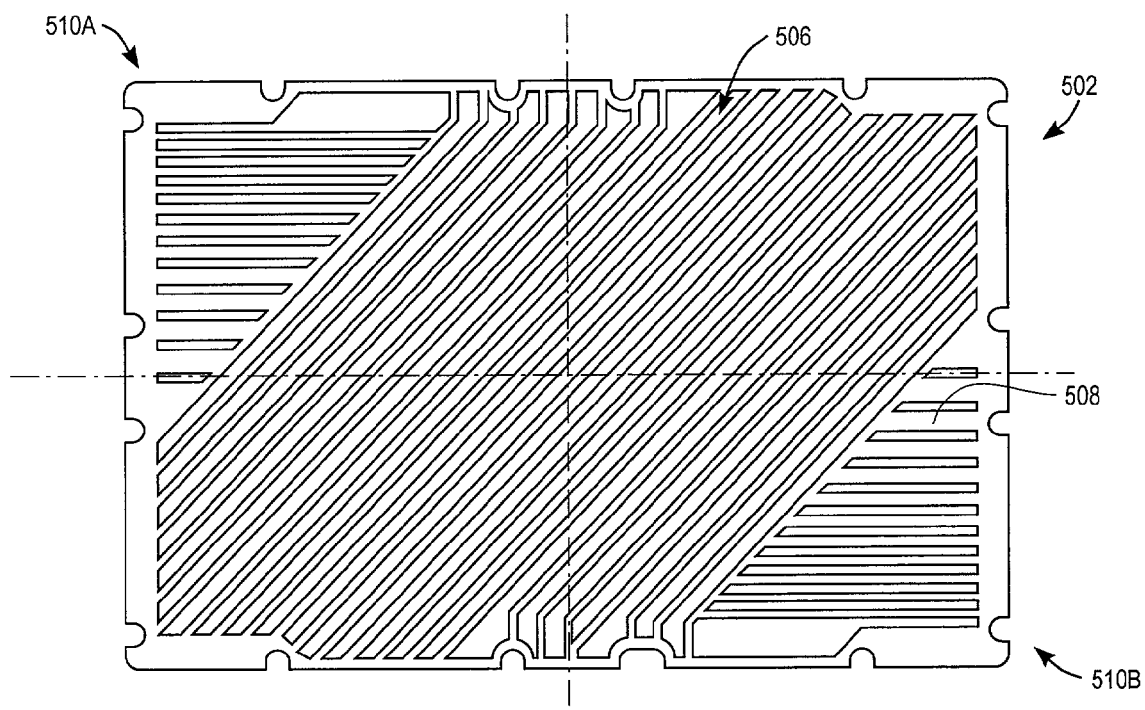
FIGS. 7D and 7E illustrate top and bottom films, respectively, of the top layer structure of FIG. 7C in accordance with the present invention.
Figure 7E:
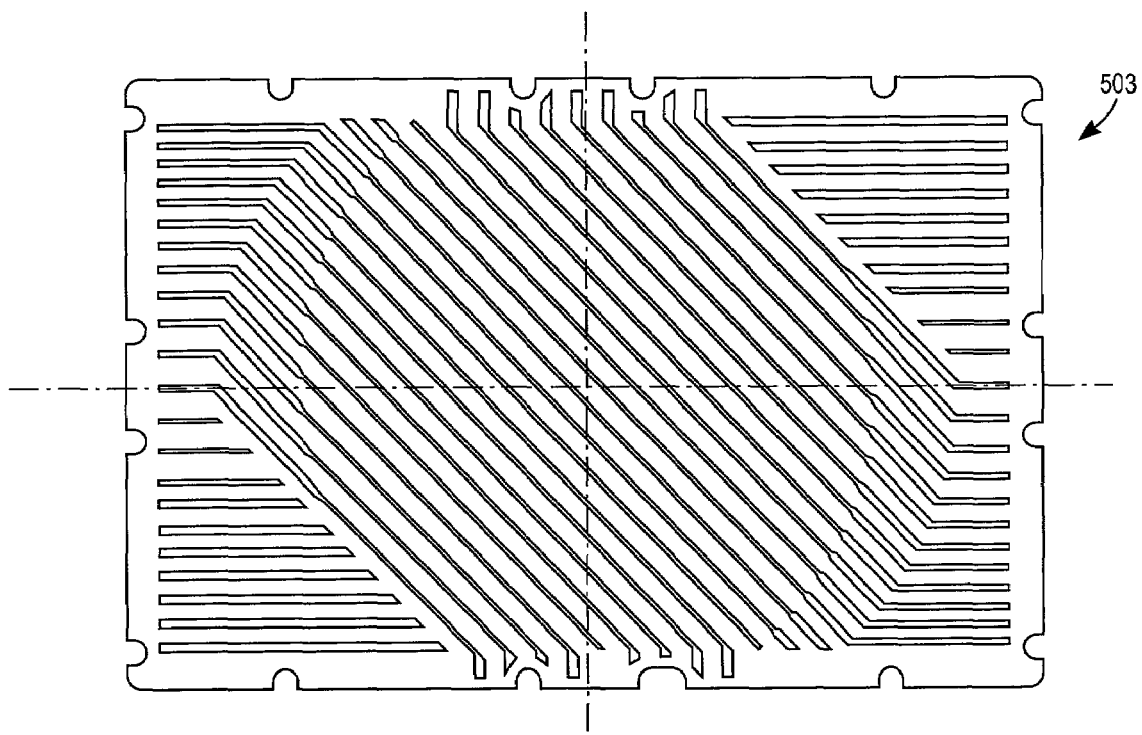

FIG. 7C illustrates an example of a top layer structure of the workpiece-surface-influencing device in accordance with the present invention. A top layer 500 includes a top film 502 (also shown in FIG. 7D) and a bottom film 504 (also shown in FIG. 7E). FIGS. 7D and 7E illustrate top and bottom films, respectively, of the top layer structure of FIG. 7C. In particular, the top film 502 includes slanted stripes 506 and straight stripes 508. The straight stripes 510 are localized at two non-adjacent corners 510A and 510B of the top film 502. By using straight stripes in the corners 510A, 510B, this design prevents any stripe that may be tangent to the edge of the wafer carrier 105 from side-wise engagement to the leading edge of the wafer carrier 105 as it moves laterally. The bottom film 504 also contains straight stripes and the slanted stripes to maintain cross hatch configuration of both layers. FIG. 7E is also the top view of the compressible layer.

Figure 8A:
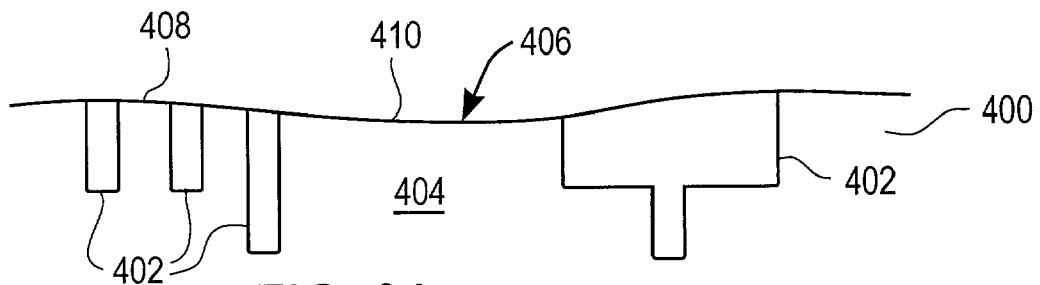
FIGS. 8A-8C illustrates an example of a non-uniform layer formed on a substrate using a conventional workpiece-surface-influencing device.
Figure 8B:
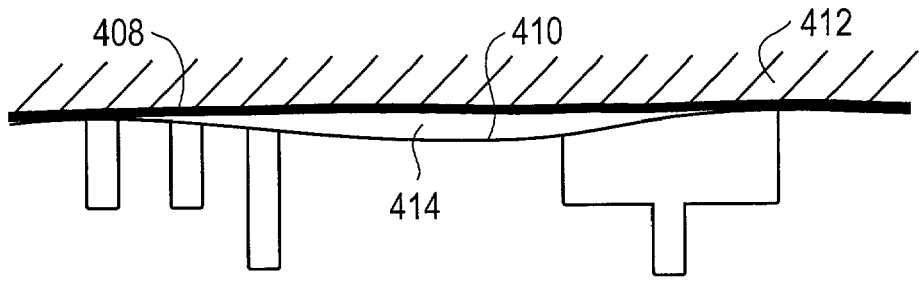
Figure 8C:
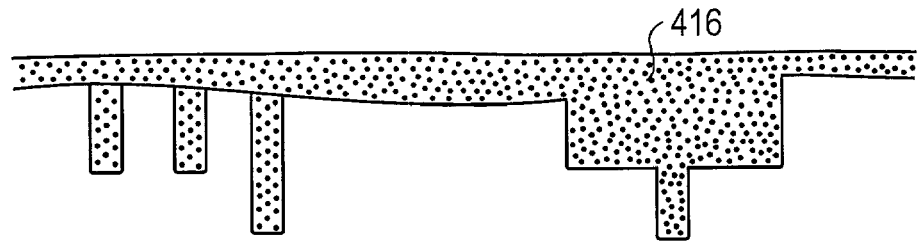

FIGS. 8A-8C illustrates an example of a non-uniform layer formed on a substrate using a conventional workpiece-surface-influencing device. FIG. 8A illustrates a substrate 400 having features 402 formed in an insulating layer 404. The substrate 400 has a non planar surface 406 that includes raised regions 408 and recessed regions 410. Such non planarity may be due to the various factors including non-ideal processing conditions performed prior to the copper deposition process step. The surface may have defects that may cause this non-planarity. Further, a small imperfection or insignificant non-planarity may be accentuated during the subsequent processing steps, that may involve deposition of multiple layers, and results in a significant non-planarity problem. Further, the surface 406 may represent a surface that has already received at least one layer of interconnect structure. Non-planarity may result in wafer carrier related problems as well, such as defective chuck face, o-rings, vacuum system problems or mechanical problems. For example, the chuck face on which the substrate is placed may be defective, or the substrate may be placed on a defective o-rings that may cause non-planarity.

Next, FIG. 8B illustrates a conventional workpiece-surface-influencing device 412 making contact with the non-planar surface 406 during the ECMD copper deposition. As shown, although the raised regions touches the device 412, the recessed regions cannot make contact with the device 412, thereby leaving a gap between the recessed regions 410 and the device 412. As shown in FIG. 7C, as the process is carried out, the gap 414 cause a copper film 416 with non-uniform thickness.

Figure 8D:
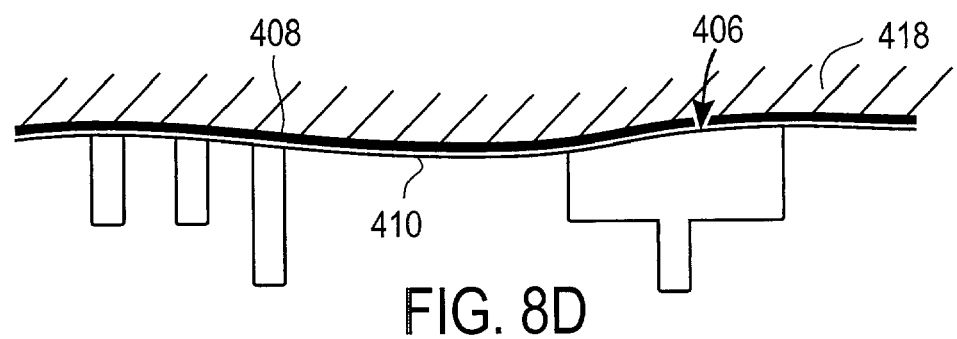
FIGS. 8D and 8E illustrates an example of an uniform layer formed on a substrate using a workpiece-surface-influencing device of the present invention.
Figure 8E:
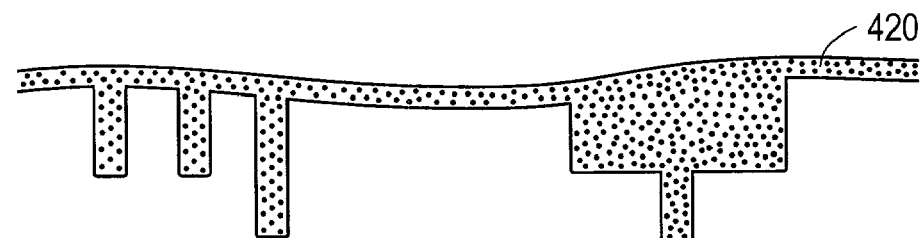

FIG. 8D and 8E illustrates an example of an uniform layer formed on a substrate using a workpiece-surface-influencing device of the present invention. As shown in FIG. 8D, the WSID 418 of the present invention conforms with the recessed regions 410 as well as the raised regions 408 during the process, and hence fully contacts the surface 406. In FIG. 8E, under these conditions, copper is deposited over the substrate surface to form a uniform layer 420.

Although various preferred embodiments have been described in detail above, those skilled in the art will readily appreciate that many modifications of the exemplary embodiment are possible without materially departing from the novel teachings and advantages of this invention.

What is claimed:

1. A system for uniformly distributing an applied low force during processing a workpiece surface using an electrochemical mechanical process with a solution applied to the workpiece surface and a potential difference between an electrode and the workpiece surface, the system comprising:
    a workpiece carrier for holding the workpiece in position during the electrochemical mechanical processing; and
    a workpiece-surface-influencing-device (WSID) for uniformly distributing the applied low force to the workpiece surface, the WSID including a compressible material adapted to cause a top surface of the WSID to conform to the workpiece surface when contact and relative motion occurs between the top surface of the WSID and the workpiece surface, wherein the WSID includes:
        a flexible top layer as the top surface;
        a rigid bottom layer; and
        a compressible intermediate layer containing the compressible material disposed in between the flexible top layer and the rigid bottom layer, wherein the rigid bottom layer, the compressible layer, and the flexible top layer each include a plurality of openings through which the solution can pass, wherein the plurality of openings in the compressible layer form a plurality of channels, wherein at least some of the plurality of channels are parallel to each other, and wherein the flexible top layer further includes another plurality of channels in which at least some of the plurality of channels intersect with at least some of the another plurality of channels in a cross hatch configuration.

2. The system according to claim 1, wherein the workpiece carrier is adapted to rotate the workpiece during processing.

3. The system according to claim 2, wherein the workpiece carrier is adapted to laterally move the workpiece during processing and the applied low force is less than about one pound per square inch.

4. The system according to claim 1, wherein the flexible top layer comprises a single layer.

5. The system according to claim 1, wherein the flexible top layer comprises a composite layer.

6. The system according to claim 5, wherein the composite layer includes an upper layer and a lower layer, and wherein the upper layer includes an abrasive disposed therein.

7. The system according to claim 5, wherein the thickness of the composite layer is less than 0.5 mm.

8. The system according to claim 1, wherein the rigid bottom layer supports the flexible top layer and the compressible intermediate layer.

9. The apparatus according to claim 1, wherein:
    the flexible top layer includes a top film and a bottom film, the top film including an abrasive disposed therein;
    the another plurality of channels are formed in the top film; and
    a third plurality of channels are formed in the bottom film.

10. The system according to claim 9, wherein the third plurality of channels in the bottom film and the plurality of channels in the compressible layer are substantially aligned.

11. The system according to claim 1, wherein the rigid bottom layer comprises the electrode.

12. The system according to claim 1, wherein the thickness of the flexible top layer is less than 0.5 mm.

13. The system according to claim 1, wherein the flexible top layer includes abrasive particles disposed therein.

14. The system according to claim 13, wherein the size of the abrasive particles is about 0.05-5.0 microns.

15. The system according to claim 1, wherein the compressible material comprises a foam or a gel.

16. The system according to claim 1, wherein the compressible material is selected from polyurethane, polypropylene, polyethylene, rubber, ethyl, vinyl, acetate, polyvinyl chloride, polyvinyl alcohol, ethylene propylene diene methyl, or combinations thereof.

17. The system according to claim 1, wherein the compressible intermediate layer is selected such that it would compress about 25% when a testing force of 1-10 pounds per square inch is applied.

18. The system according to claim 1, wherein the compressible intermediate layer is adapted to compress less than 2 mm.

19. The system according to claim 1, wherein the flexible top layer comprises a top film and a bottom film attached to each other.

20. The system according to claim 19, wherein the top film includes abrasive particles therein.

21. The system according to claim 19, wherein the thickness of the top film is in the range of 0.05-5.0 mm.

22. The system according to claim 19, wherein the thickness of the top film is in the range of 0.1-1.0 mm.

23. The system according to claim 1, wherein the solution comprises an electro-plating solution, an electro-etching solution or an electro-polishing solution.

24. The system according to claim 1, wherein the applied force is less than about 1 pound per square inch.

25. The system according to claim 1, wherein the applied force is less than 0.5 pounds per square inch.

26. The system according to claim 1, wherein the workpiece carrier includes a coil mechanism.

27. The system according to claim 1, wherein the top surface of the WSID has a surface area that substantially covers the entire workpiece surface except for an edge region.

28. The system according to claim 1, wherein the top surface of the WSID has a surface area that is substantially smaller than a surface area of the workpiece surface, and further including a mechanism for moving the WSID across the entire workpiece surface.

29. A system for uniformly distributing an applied low force during processing a workpiece surface using an electrochemical mechanical process with a solution applied to the workpiece surface and a potential difference between an electrode and the workpiece surface, the system comprising:
 a workpiece carrier for holding the workpiece in position during the electrochemical mechanical processing; and
 a workpiece-surface-influencing-device (WSID) for uniformly distributing the applied low force to the workpiece surface, the WSID including a compressible material adapted to cause a top surface of the WSID to conform to the workpiece surface when contact and relative motion occurs between the top surface of the WSID and the workpiece surface, wherein the WSID includes:
  a flexible top layer as the top surface;
  a rigid bottom layer; and
  a compressible intermediate layer containing the compressible material disposed in between the flexible top layer and the rigid bottom layer, wherein the flexible top layer comprises a top film and a bottom film attached to each other, wherein the top film contains a plurality of channels and the bottom film contains another plurality of channels such that the plurality of channels and the another plurality of channels intersect each other in a cross hatch configuration.

30. The system according to claim 29, wherein the compressible intermediate layer includes open pore networks that allow the solution to pass therethrough.

31. A system for uniformly distributing an applied low force during processing a workpiece surface using an electrochemical mechanical process with a solution applied to the workpiece surface and a potential difference between an electrode and the workpiece surface, the system comprising:
 a workpiece carrier for holding the workpiece in position during the electrochemical mechanical processing; and
 a workpiece-surface-influencing-device (WSID) for uniformly distributing the applied low force to the workpiece surface, the WSID including a compressible material adapted to cause a top surface of the WSID to conform to the workpiece surface when contact and relative motion occurs between the top surface of the WSID and the workpiece surface, wherein the WSID includes:
  at least two compressible layers, with at least one of the compressible layers containing the compressible material;
  a least one rigid support layer disposed in between the at least two compressible layers; and
  a flexible layer attached to one compressible layer, wherein the flexible layer makes contact with the workpiece surface, wherein the flexible top layer and at least one of the compressible intermediate layers each include a plurality of channels arranged in a cross hatch configuration and the other compressible layer and the rigid support layer contain openings of some type through which solution can pass.

\* \* \* \* \*